United States Patent [19]
Tsuyama et al.

[11] Patent Number: 6,058,553
[45] Date of Patent: May 9, 2000

[54] WIPER FOR A VEHICULAR MIRROR

[75] Inventors: Osamu Tsuyama; Hiroyasu Ohnuki, both of Isehara, Japan

[73] Assignee: Ichikoh Industries, Ltd., Tokyo, Japan

[21] Appl. No.: 09/163,363

[22] Filed: Sep. 30, 1998

[30] Foreign Application Priority Data

| Sep. 30, 1997 | [JP] | Japan | 9-265558 |
| Sep. 30, 1997 | [JP] | Japan | 9-265559 |
| Sep. 30, 1997 | [JP] | Japan | 9-265560 |
| Sep. 30, 1997 | [JP] | Japan | 9-265561 |
| Mar. 11, 1998 | [JP] | Japan | 10-059277 |

[51] Int. Cl.$^7$ .................................................. B60S 1/56
[52] U.S. Cl. .................... 15/250.003; 359/872; 359/874; 359/507
[58] Field of Search .................. 015/250.003, 250.3, 015/250.001; 359/871, 872, 874, 507

[56] References Cited

U.S. PATENT DOCUMENTS

| 4,320,554 | 3/1982 | Tamura et al. | 15/250.003 |
| 4,466,712 | 8/1984 | Vitaloni | 15/750.003 |
| 5,203,090 | 4/1993 | Han | 15/250.003 |

FOREIGN PATENT DOCUMENTS

| 21934 | 2/1981 | Japan | 15/250.003 |

*Primary Examiner*—Gary K. Graham
*Attorney, Agent, or Firm*—Foley & Lardner

[57] ABSTRACT

To house drive components in a single drive section casing and shorten a link member, a mirror (57a) is held by a mirror casing (56). A right-and-left motor (61) and an up-and-down motor (62) are housed within a drive section casing (55). If the motors (61, 62) are driven, a tilting mechanism unit tilts the mirror (57a). A wiper motor (63) is housed within the drive section casing (55). A wiper drive transfer unit for transferring rotation of the wiper motor (63) is housed within the drive section casing (55). Furthermore, a link mechanism section (D) and a rotary shaft section (E) for transferring output of the wiper drive transfer unit to reciprocal rotary motion are housed in the mirror casing (56). By the reciprocal rotary motion converted by the link mechanism section (D) and rotary shaft section (E), a wiper main body wipes the surface of the mirror.

6 Claims, 14 Drawing Sheets

WIPER FOR A VEHICULAR MIRROR

BACKGROUND OF THE INVENTION

1. Field of the Invention

The present invention relates to wipers that are used in vehicular mirrors which can be electrically tilted, such as a door mirror, a side-view mirror, etc.

2. Description of the Related Art

Conventionally, some of the vehicular door mirrors and side-view mirrors are provided with a wiper which wipe waterdrops attached to the surface to ensure visibility.

FIG. 14 shows a side-view mirror 1 provided with such a wiper function. The side-view mirror 1 is equipped with a mirror main body 10, a wiper main body 20, and a link mechanism section 30 connecting this wiper main body 20 with the mirror main body 10.

The mirror main body 10 is equipped with a synthetic resin housing 11, a reinforcement plate 12 fixed to the housing 11, and a mirror drive unit 13 fixed to the reinforcement plate 12. Furthermore, the mirror main body 10 is equipped with a wiper drive unit 14 fixed to the housing 11, rods 15 fixed to the mirror drive unit 13, a mirror base 16 connected to the mirror drive unit 13 through the rods 15, a mirror 17 held by the mirror base 16, holding plates 18 fixed to the housing 11 and clamping a stay 2 fixed to a vehicular body (not shown), and a cover 19 for the holding plate 18.

The wiper main body 20 is equipped with a wiper arm 21, a primary lever 22 connected to the free end of the wiper arm 21, secondary levers 23 connected to both ends of the primary lever 22 so that they are pivotable, a vertebra 24 held over the secondary levers 23, and a wiper blade 25 pivotably held on the vertebra 24.

The link mechanism section 30 is equipped with a first link member 31 mounted at one end thereof on the output shaft 14a of the wiper drive unit 14, a second link member 32 coupled at one end thereof to the other end of the first link member 31 through a shaft 32, a third link member 35 coupled at one end thereof to the other end of the second link member 33 through a shaft 34, and a wiper shaft 40 coupled to the other end of the third link member 35. The third link member 35 is provided with a cylinder member 35a rotatably inserted into a cylindrical portion 11a protruding from the housing 11.

The wiper shaft 40 is equipped with a pair of shaft members 41 and 42 and a coupling member 43. The coupling member 43 couples one end of the inner shaft member 41 and one end of the outer shaft member 42 together, thereby making the intermediate portion of the wiper shaft 40 bendable and allowing rotation of the wiper shaft 40.

The other end of the inner shaft member 41 (one end of the wiper shaft 40) is held in the cylinder member 35a so that it cannot rotate relative to the cylinder member 35a and can slide along the axial direction of the cylinder member 35a. Therefore, the rotary motion of the output shaft 14a is converted to reciprocal rotary motion by the link members 31, 33, and 35, and this reciprocal rotary motion is transferred to the wiper shaft 40.

The other end of the outer shaft member 42 (the other end of the wiper shaft 40) passes through holes formed in the mirror base 16 and mirror 17 and is fixed to the base portion 21a of the wiper arm 21 by means of a nut 26.

In the above-mentioned constitution, if the wiper drive unit 14 is driven, the output shaft 14a will rotate. This rotation causes the inner shaft member 41 to reciprocate and rotate within the cylindrical portion 11a integrally with the cylinder member 35a through the link mechanism section 30. At the same time, the outer shaft member 42 reciprocates and rotates integrally with the inner shaft member 41 through the coupling member 43, whereby the wiper arm 21 reciprocates and rotates. This reciprocation and rotation of the wiper arm 21 causes the wiper blade 25 to wipe the surface of the mirror 17.

The range of rotation of the wiper shaft 40 depends upon the setting of the link mechanism section 30. The coupled position of the wiper arm 21 relative to the wiper shaft 40 is adjusted according to the range of rotation of the wiper shaft 40. With this, the wiping range of the wiper blade 25 relative to the mirror 17 is determined.

Note that the wiping range is set so that it is slightly narrower than the reciprocal rotary motion range of the wiper main body 20 by protruding the housing 11 from the surface of the mirror 17. Therefore, if the wiper blade 25 abuts on the housing 11, the reciprocal rotary motion range will be consistent with the wiping range. At this time, even if the reciprocal rotary motion range of the wiper main body 20 is wider than the wiping range, the difference will be slight and therefore there will be no possibility that deformation of the wiper arm 21, damage to the wiper motor within the wiper drive unit 14, etc., will occur. In other words, the wiping range is set so that it is within an allowable range in which deformation of the wiper arm 21 and damage to the wiper motor will not occur.

Incidentally, in the wiper for a vehicular mirror constituted as described above, the mirror drive unit 13 and the wiper drive unit 14 are provided independently of each other. Moreover, the wiper drive unit 14 is provided at a position away from the mirror drive unit 13. For this reason, the output shaft 14a of the wiper drive unit 14 and the shaft 32 are at positions away from the wiper shaft 40.

Therefore, there is a need to assemble the mirror drive unit 13 and the wiper drive unit 14 separately in the housing 14. This assembly results in high rises in the part cost, such as screws, and the assembling operation cost. In addition, the third link member 35 extending between the output shaft 14a and the shaft 32 becomes long. To make the third link member 35 long, there is a disadvantage that the third link member 35 must be designed so as to bypass the mirror drive unit 13.

SUMMARY OF THE INVENTION

The present invention has been made in view of the aforementioned disadvantages. Accordingly, it is an object of the present invention to provide a wiper for a vehicular mirror which is capable of housing drive components in a single drive section casing and also shortening link members.

To achieve this end, there is provided a wiper for a vehicular mirror which comprises: a mirror casing for holding a mirror; wiper drive means housed in a drive section casing; wiper drive transfer means housed in the drive section casing for transferring rotation of the wiper drive means; a link mechanism section housed in the mirror casing for converting the rotation transferred by the wiper drive transfer means to reciprocating motion; a rotary shaft section housed in the mirror casing for converting the reciprocating motion converted by the link mechanism section to reciprocal rotary motion; a wiper main body for wiping a surface of the mirror by the reciprocal rotary motion converted by the rotary shaft section; and a mirror tilting unit housed in the drive section casing for tilting the mirror.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

An embodiment of a wiper for a vehicular mirror according to the present invention will be applied to a side-view mirror for a large vehicle and described based on the accompanying drawings.

Figure 1:
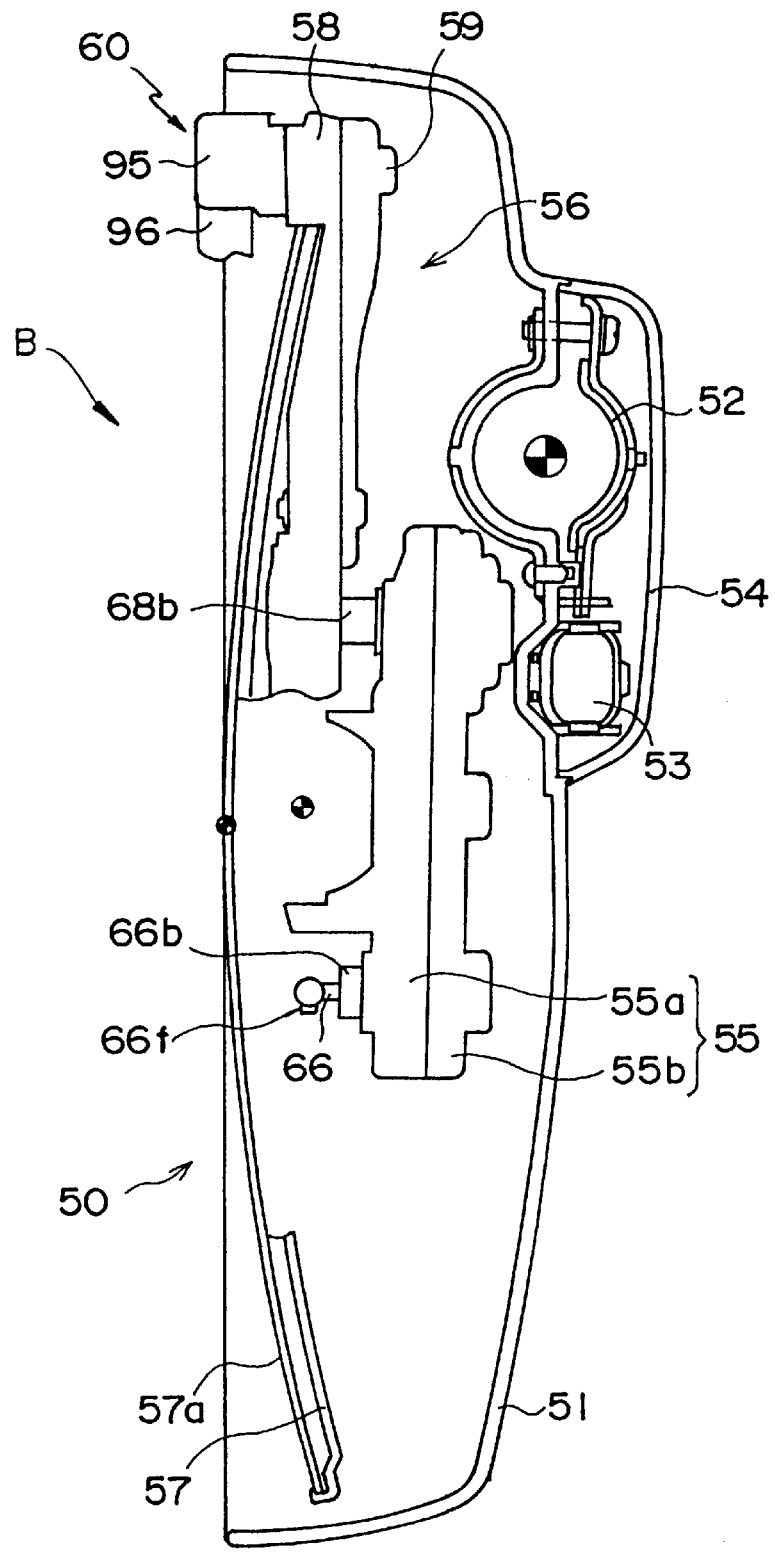
FIG. 1 is a side elevational view a wiper for a side-view mirror according to an embodiment of the present invention, the housing of the side-view mirror having been removed to show components within the housing.
Figure 2:
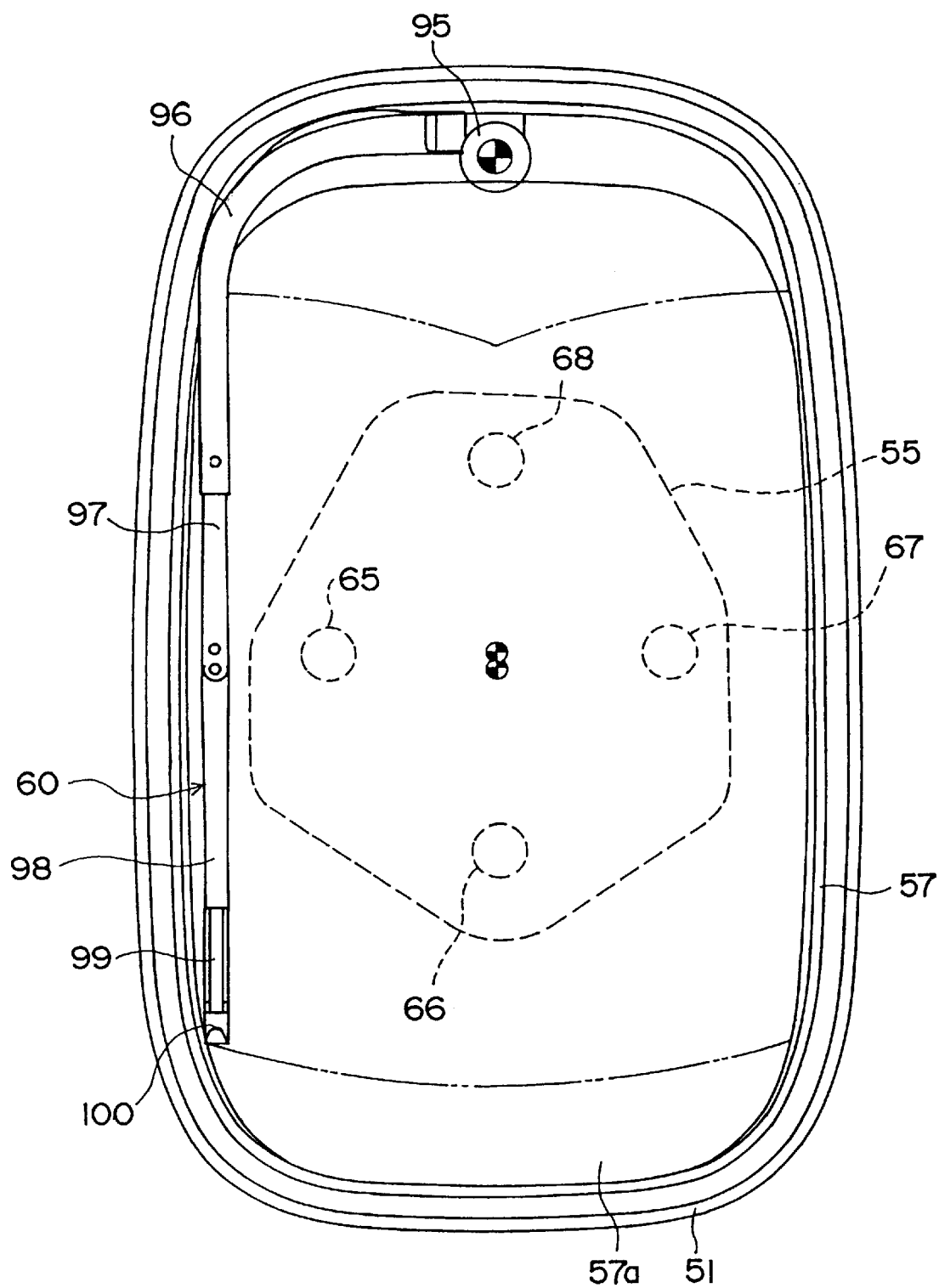
FIG. 2 is a front view of the side-view mirror shown in FIG. 1.

In FIGS. 1 and 2, reference numeral 50 denotes a mirror main body. The circumferential edge and back surface of this mirror main body 50 is covered with a housing 51.

A bracket 52 and a connector 53 are fixed in vicinity to the housing 51. The bracket 52 is used to attach a side-view mirror B to the mirror attachment shaft or mirror attachment pivot of the vehicular body (not shown) in cooperation with a portion of the housing 51. The connector 53 is connected to a power supply. This bracket 52 and connector 53 are covered with a cover 54. Also, to the housing 51 a drive section casing 55 consisting of a pair of covers 55a and 55b is fixed. This drive section casing 55 holds a mirror casing 56 so that the mirror casing 56 is tiltable. The mirror casing 56 is equipped with a mirror holder 57 for holding a mirror 57a, a pair of bases 58 engaging with the mirror holder 57, and a cover 59. A wiper main body 60 is attached to the mirror casing 56.

Figure 3:
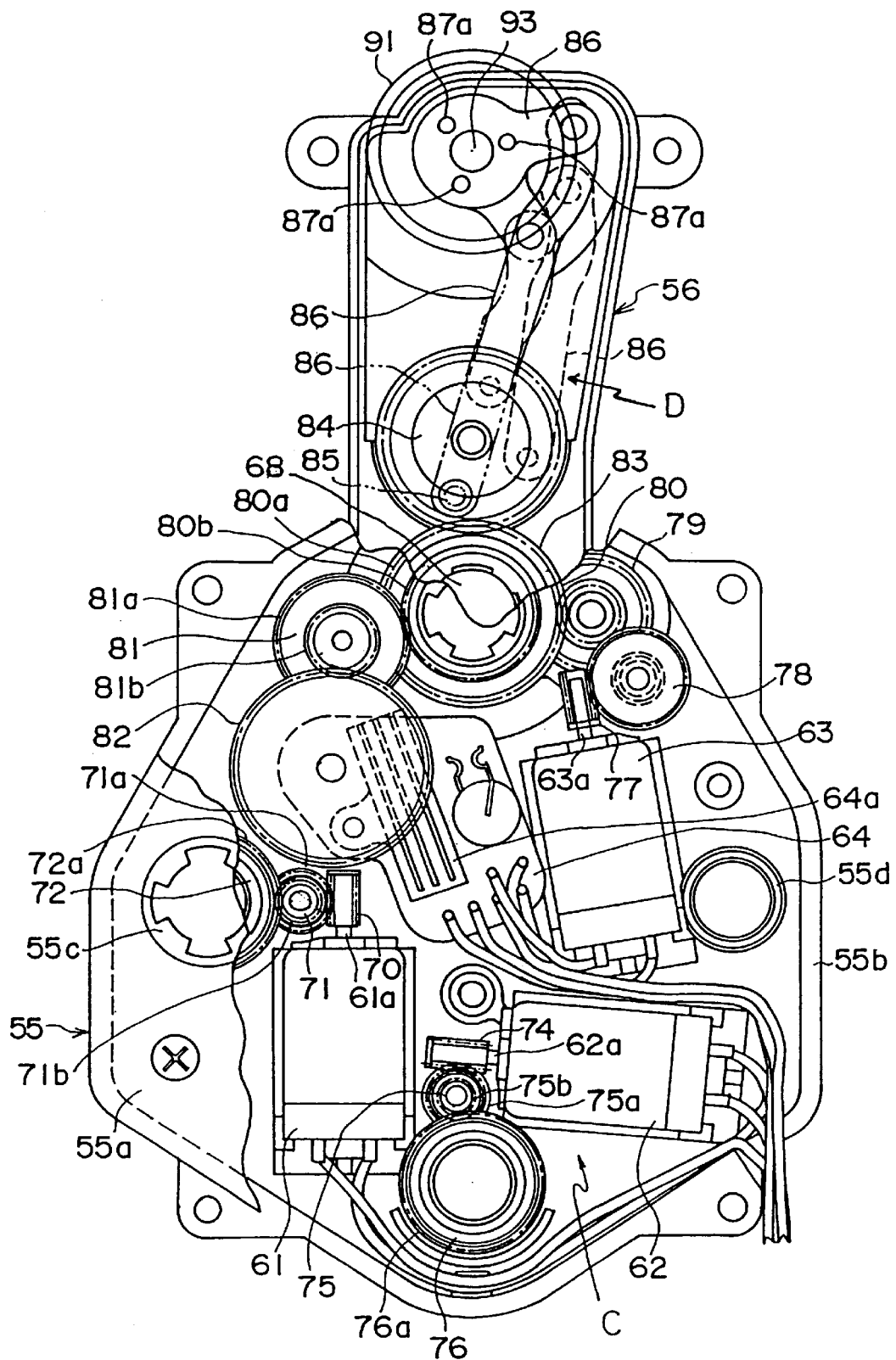
FIG. 3 is an enlarged diagram of the drive section shown in FIG. 1, the casing of the drive section having been removed to show the drive section.

As shown in FIG. 3, a drive section C for tilting the mirror 57a and driving the wiper main body 60 is housed interiorly of the drive section casing 55.

The drive section C is provided with a right-and-left motor 61 for tilting the mirror 57a in the right-and-left direction of the vehicular body, an up-and-down motor 62 for tilting the mirror 57a in the up-and-down direction of the vehicular body, a wiper motor 63 for driving the wiper main body 60, and a control circuit 64. The respective point ends of first to fourth rods 65 to 68 protrude from the drive section casing 55 and are coupled to the mirror casing 56.

Figure 4:
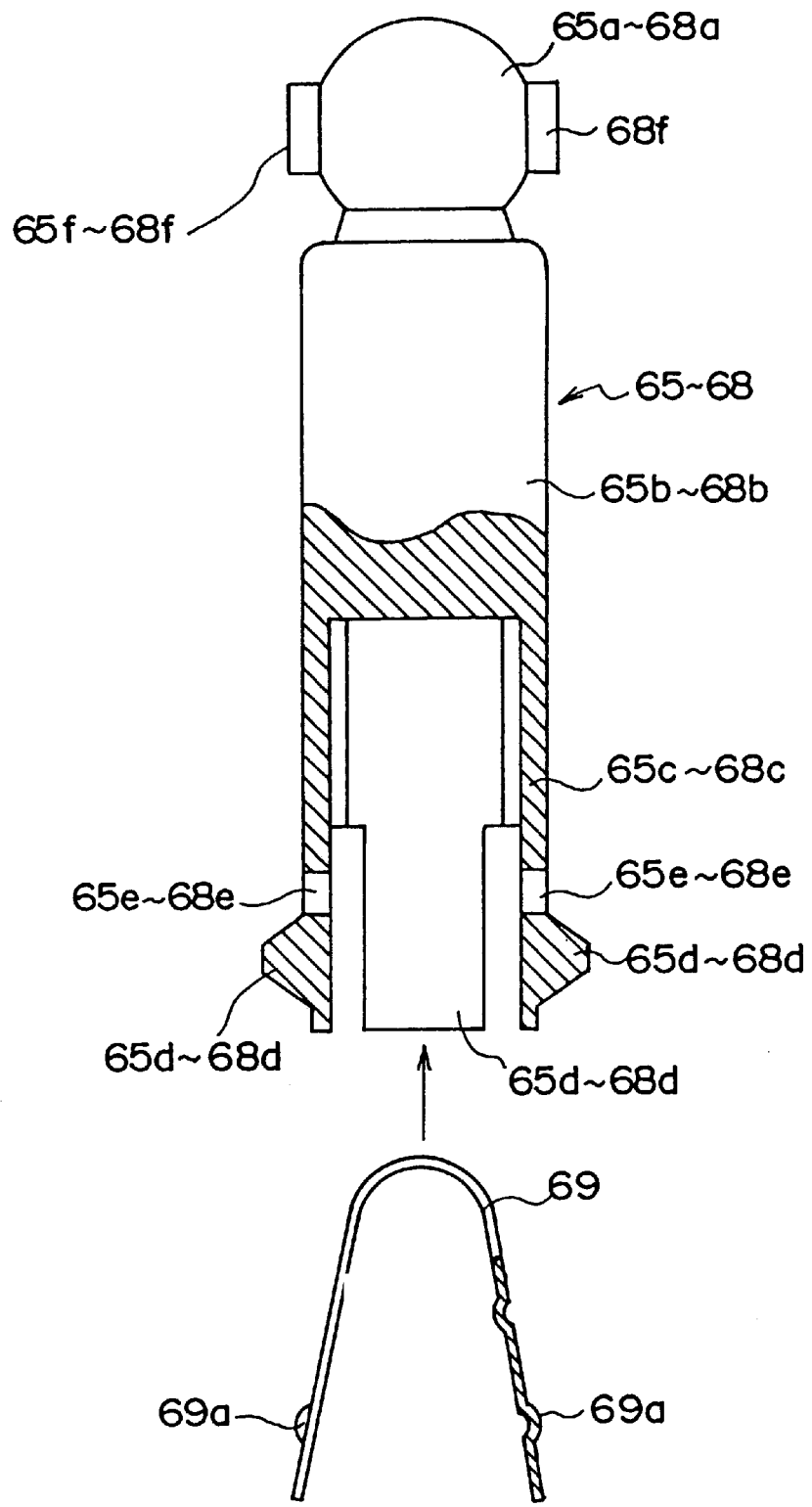
FIG. 4 is an enlarged diagram of a rod which is driven by a mirror tilting motor.

If the motors 61 and 62 are rotated, the protrusion quantity of the first to the fourth rods 65 to 68 from the drive section casing 65 will vary. The first to the fourth rods 65 to 68, as shown in FIG. 4, are equipped with spherical head portions 65a to 68a, cylindrical stem portions 65b to 68b, a plurality of leg portions 65c to 68c, and engagement protrusions 65d to 68d protruding outwardly of the two opposed leg portions 65c to 68c, respectively. Each rod is integrally formed by resin molding. A generally U-shaped spring 69 is inserted into the leg portion 65c (66c to 68c) to urge the leg portion 65c (66c to 68c) outward. The protruding portions 69a of the spring 69 engage with the engagement holes 65e (66e to 68e) of the leg portion 65c (66c to 68c), whereby the spring 69 is held by the leg portion 65c (66c to 68c).

Note that the first to the fourth rods 65 to 68 are identical in shape with one another except that while the head portions 65a to 67a of the first to the third rods 65 to 67 are formed with a single protrusion (65f to 67f), the head portion 68a of the fourth rod 68 is formed with two protrusions 68f.

Figure 5:
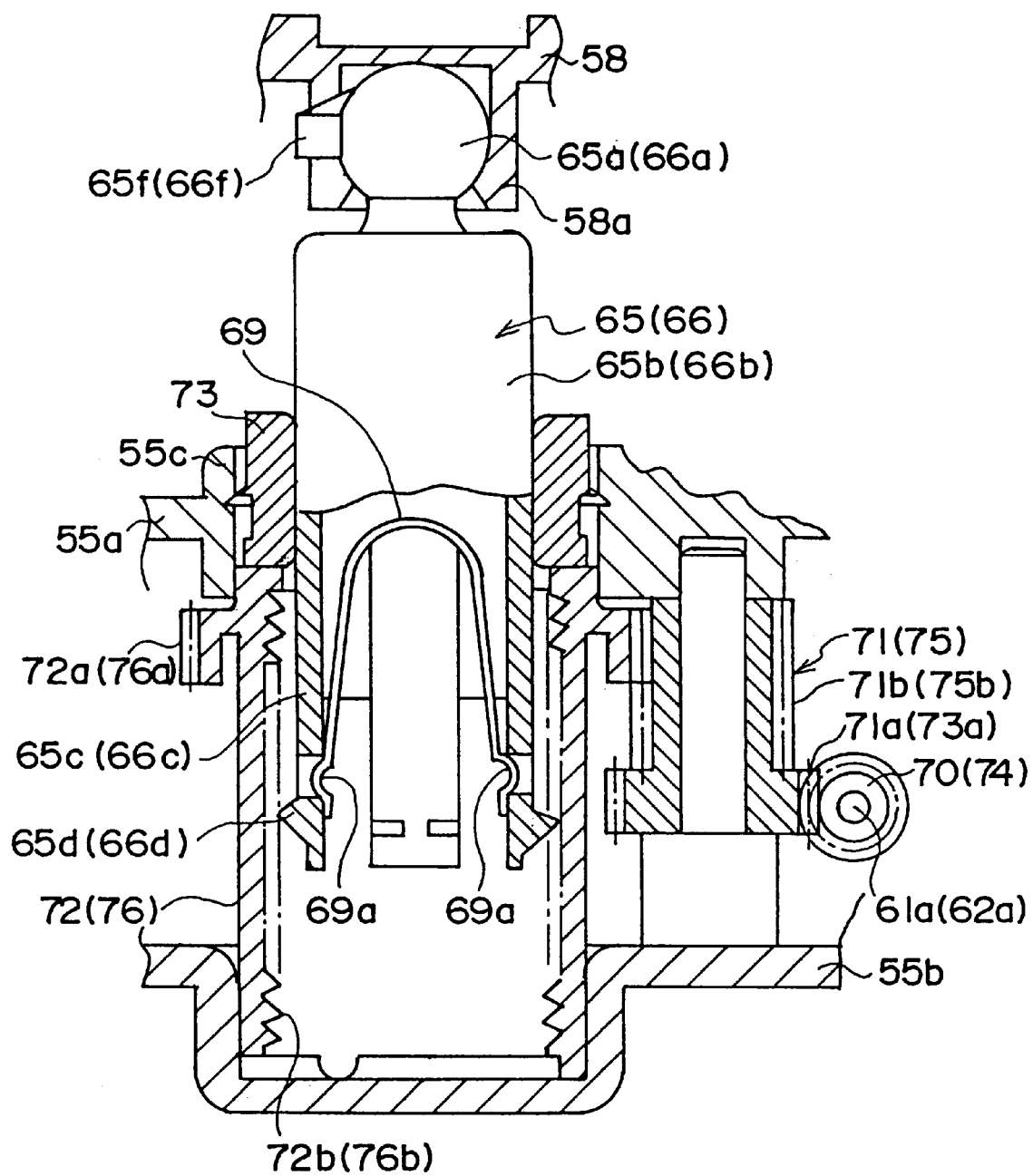
FIG. 5 is an enlarged sectional view showing how the rod shown in FIG. 4 is operated by the mirror tilting motor.

A worm gear 70 is mounted on the output shaft 61a of the right-and-left motor 61. As shown in FIG. 3, this worm gear 70 meshes with the large-diameter gear 71a of a multi-stage gear 71. The small-diameter gear 71b of the multi-stage gear 71 meshes with the gear portion 72a of a cylindrical gear 72 which covers the proximal portion of the first rod 65. As shown in FIG. 5, the inner wall surface of the cylindrical gear 72 is formed with a gear 72b, which in turn meshes with the engagement protrusion 65d of the first rod 65.

Therefore, if the right-and-left motor 61 is driven, then the worm gear 70, multi-stage gear 71, and cylindrical gear 72 will rotate. The head portion 65a of the first rod 65 is connected by the protrusion 65f to the cylindrical engagement portion 58a of the base 58 so that it can roll and cannot rotate.

For this reason, if the cylindrical gear 72 rotates, the first rod 65 will be displaced according to the direction of rotation while being guided by the gear 72b, and consequently, the protrusion quantity of the first rod 65 from the drive section casing 65 will vary. The surface of the stem portion 65b of the first rod 65 is contacted by a packing 73 held on a cylindrical portion 55c formed in the cover 55a. With this, the drive section casing 55 is hermetically sealed.

A worm gear 74 is mounted on the output shaft 62a of the up-and-down motor 62. The worm gear 74 meshes with the large-diameter gear 75a of a multi-stage gear 75. The small-diameter gear 75b of the multi-stage gear 75 meshes with the gear portion 76a of a cylindrical gear 76 which covers the proximal portion of the second rod 66. As with the first rod 65, the engagement protrusion 66d of the second rod 66 meshes with the gear 76b of the cylindrical gear 76.

Since the constitution leading from the up-and-down motor 62 to the displacement of the second rod 66 is the same as the constitution leading from the right-and-left motor 61 to the displacement of the first rod 65 shown in FIG. 5, the reference numerals will be applied to FIG. 5, thereby omitting a detailed description thereof.

Figure 6:
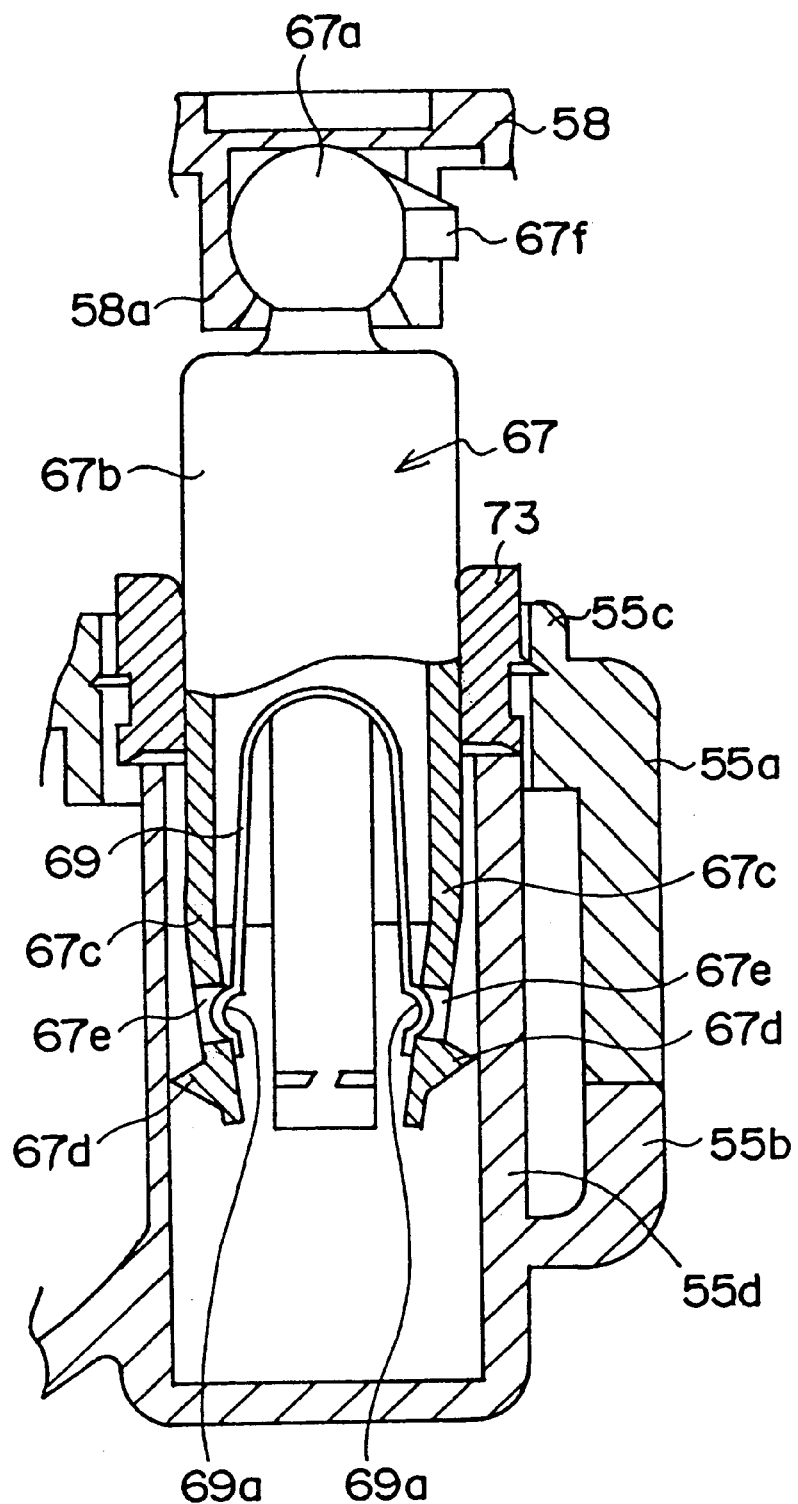
FIG. 6 is an enlarged sectional view showing how the mirror is tilted by the rod.

As shown in FIG. 6, the proximal portion of the third rod 67 is located within a cylindrical portion 55d formed in the cover 55b. The third rod 67 is displaced within the cylindrical portion 55d in correspondence to the displacements of the first and second rods 65 and 66. Although the cylindrical portion 55d is not formed with a gear similar to the above-mentioned gear 72b or 76b, the diameter of the cylindrical portion 55d is reduced so that the engagement protrusion 67d can elastically contact with the cylindrical portion 55d by the urging force of the leg portion 67c and spring 69. With this arrangement, the third rod 67 can hold its position corresponding to the displacement based on the displacements of the first and second rods 65 and 66.

A worm gear 77 is mounted on the output shaft 63a of the wiper motor 63. The worm gear 77 meshes with a first multi-stage gear 78, which in turn meshes with a second multi-stage gear 79. The second multi-stage gear 79 meshes with the large-diameter gear 80a of a third cylindrical multi-stage gear 80. The small-diameter gear 80b of the third multi-stage gear 80 meshes with the large-diameter gear 81a of a fourth multi-stage gear 81. The small-diameter gear 81b of the fourth multi-stage gear 81 meshes with a sensor gear 82.

Therefore, if the wiper motor 63 is driven, then the worm gear 77 will rotate and, at the same time, the multi-stage gears 78 and 79, cylindrical multi-stage gear 80, multi-stage gear 81, and sensor gear 82 will rotate.

The bottom surface of the sensor gear 82 is provided with a plurality of protrusions (not shown), which are shifted from one another in radial and circumferential directions so that they can make contact with contacts 64a formed on a circuit board 64. With this arrangement, the revolution speed (or rotation quantity) of the sensor gear 82 is detected. Based on this result of detection, the drive of the wiper motor 63 is automatically stopped.

More specifically, the wiping of the mirror 57a does not need to be continued as in a wiper for a front windshield glass, for example. Therefore, at the time a wiping operation has been performed a predetermined number of times (e.g., thrice), the drive of the wiper motor 63 is automatically stopped.

Figure 7:
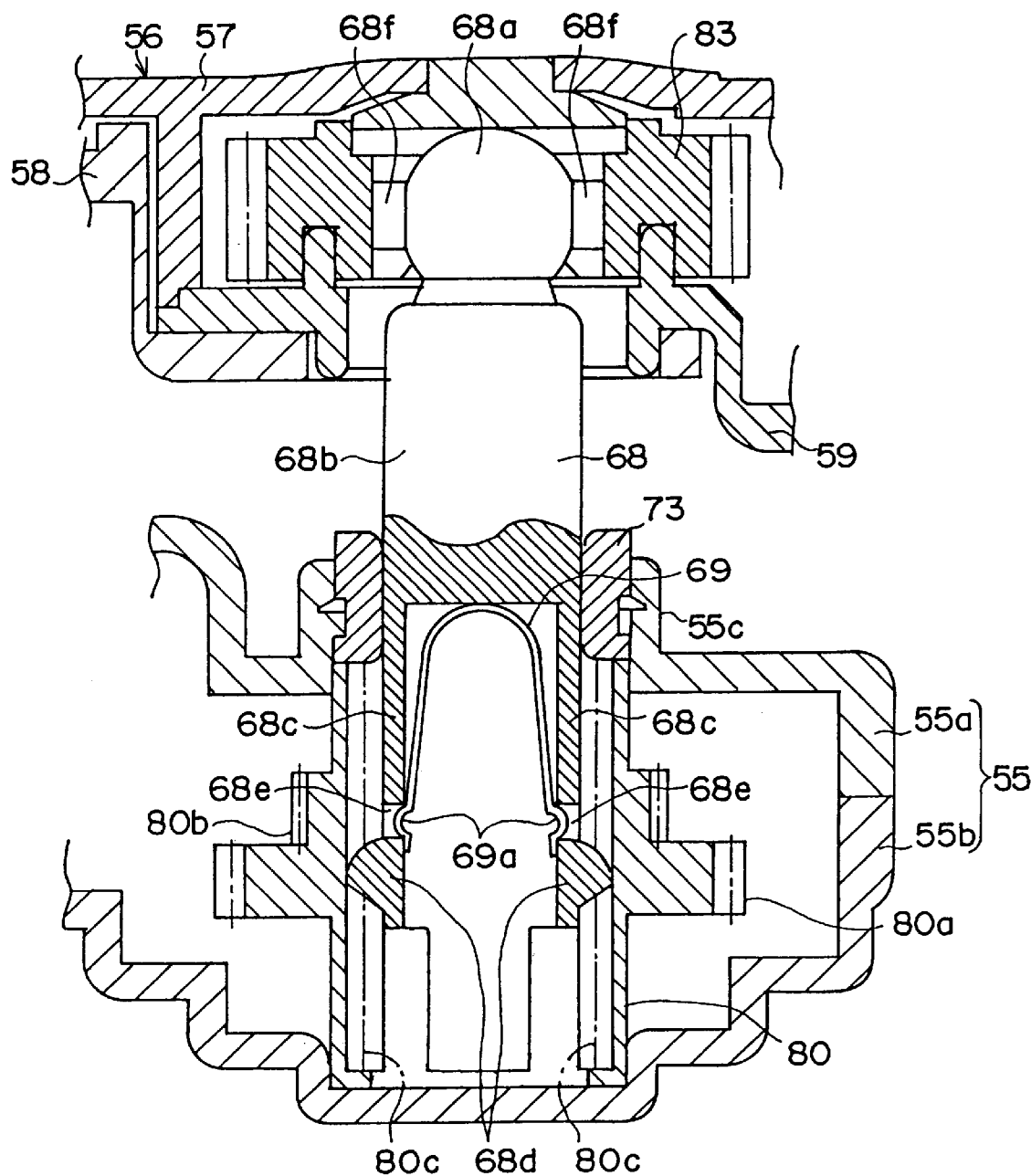
FIG. 7 is an enlarged sectional view showing a rod which is driven by a wiper drive motor.
Figure 8:
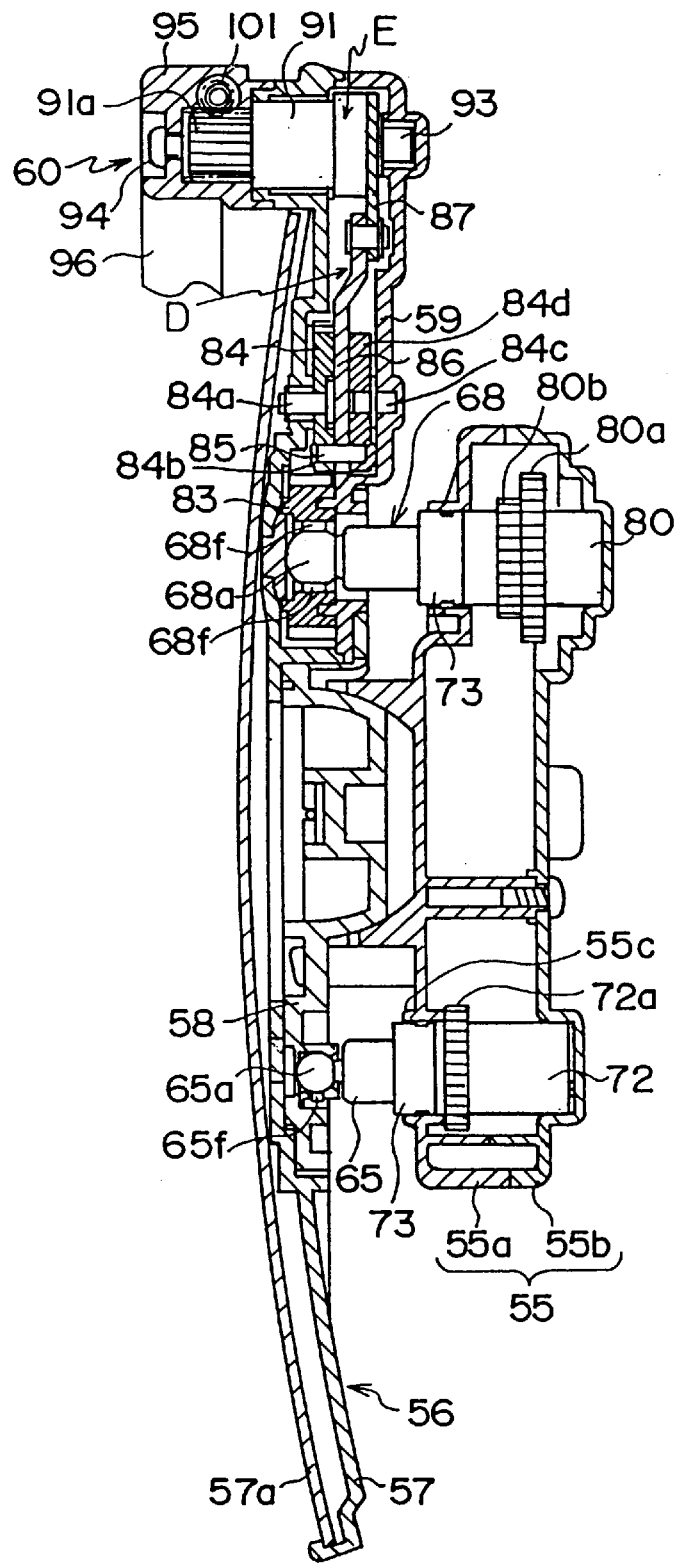
FIG. 8 is a vertical sectional view of the mirror.
Figure 9:
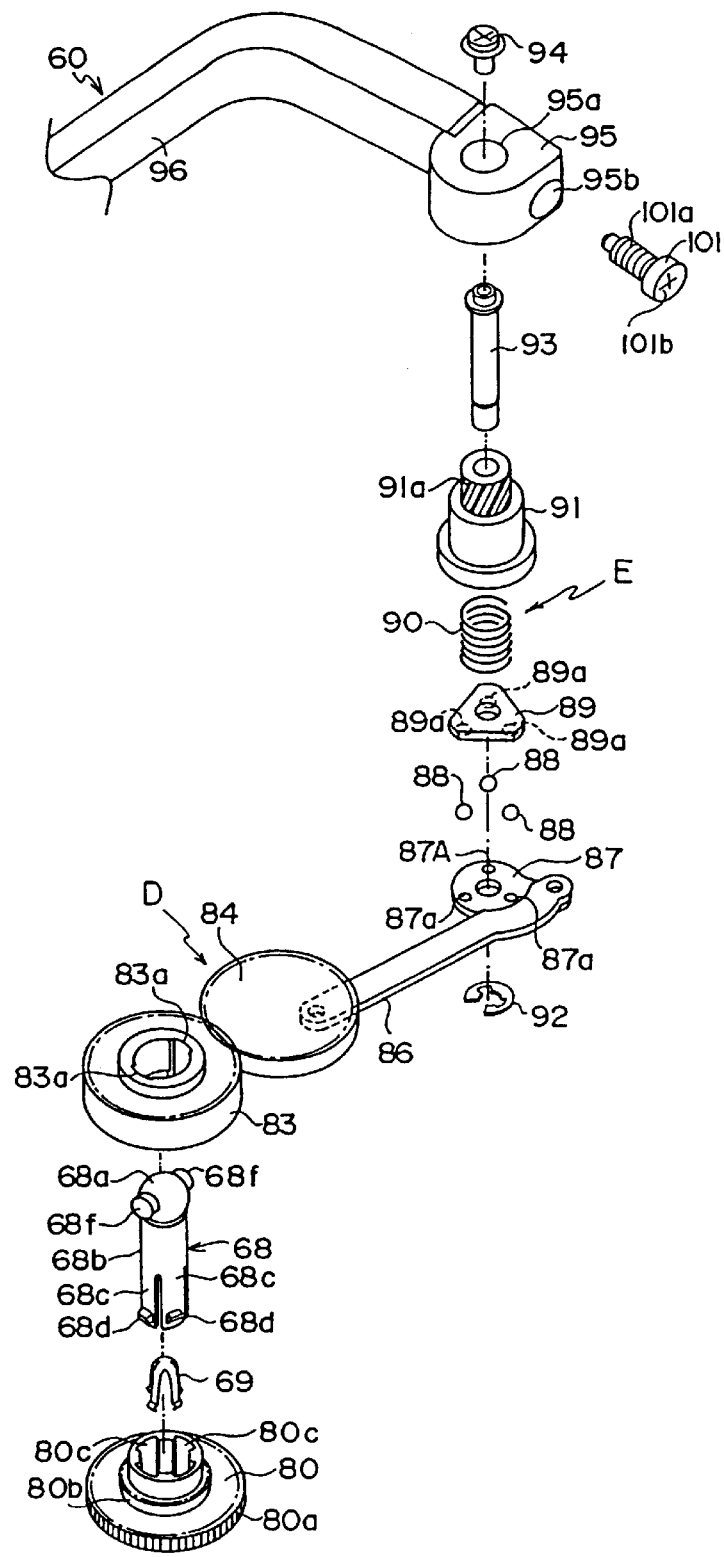
FIG. 9 is an exploded perspective view of the link mechanism section and rotary shaft section shown in FIG. 8.
Figure 10:
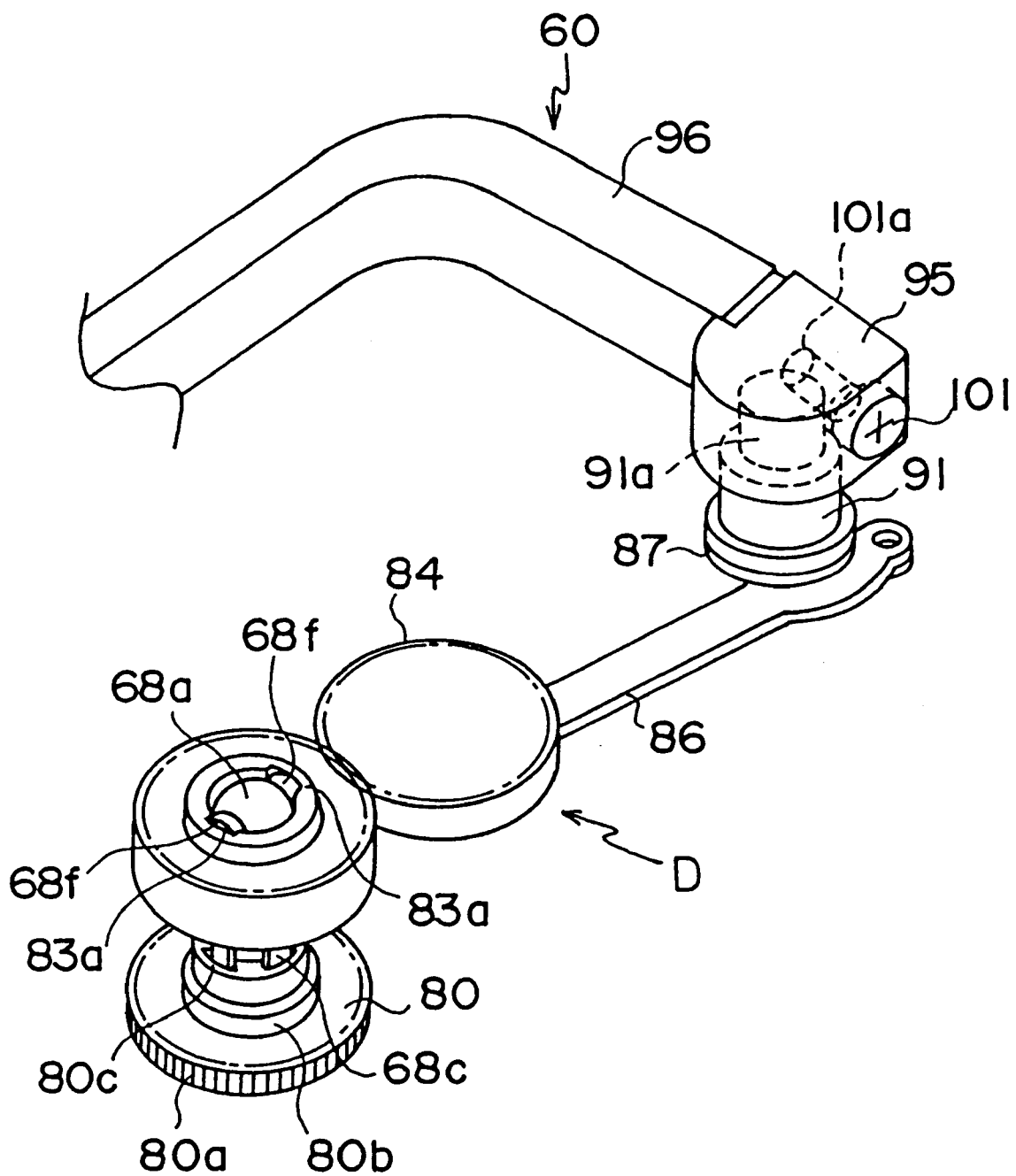
FIG. 10 is a perspective view showing the link mechanism section and the rotary shaft section assembled together.
Figure 11:
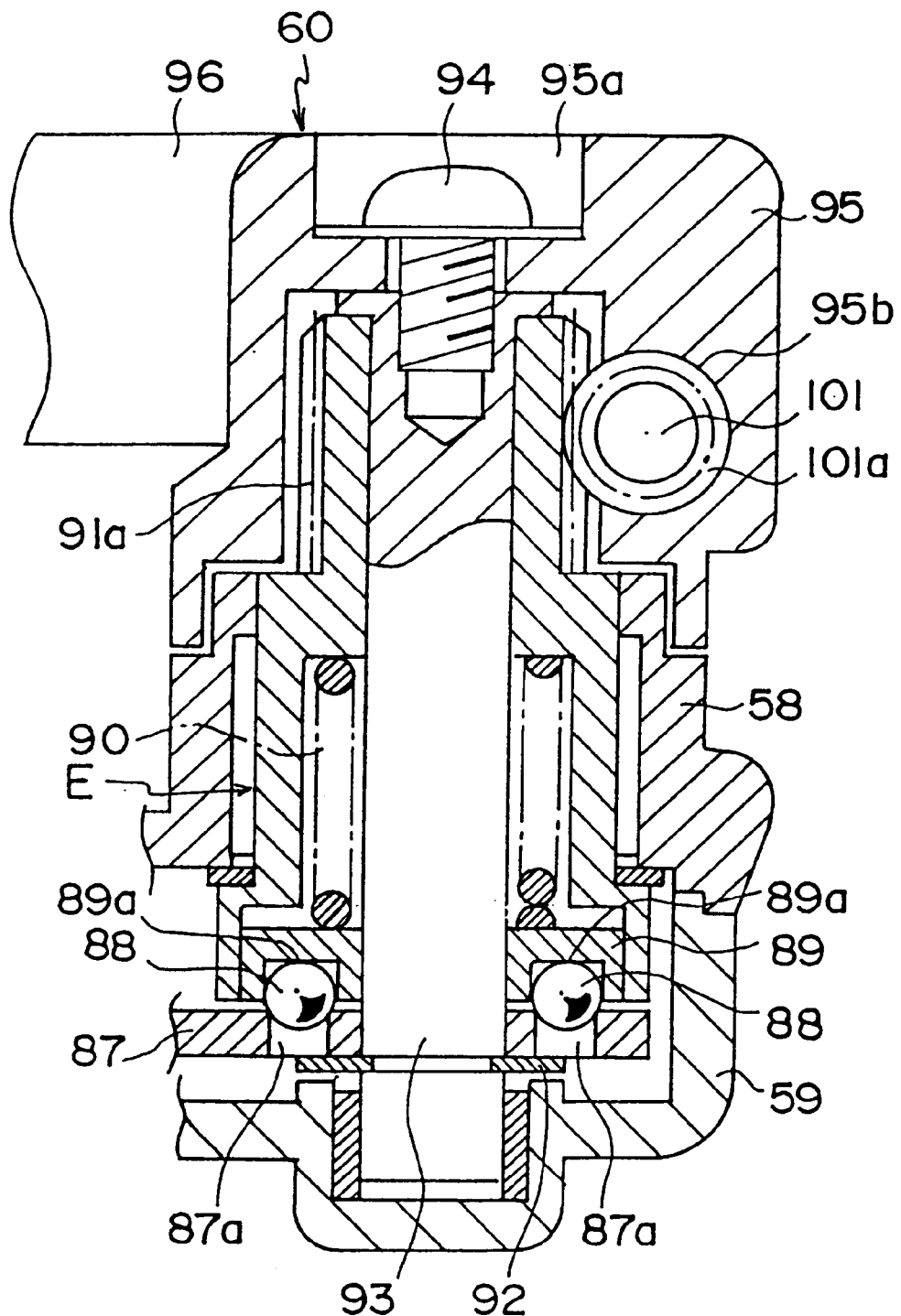
FIG. 11 is an enlarged sectional view of the rotary shaft section.

On the other hand, the proximal portion of the fourth rod 68 engages with a slit 80c formed along the axial direction in the inner wall surface of the cylindrical multi-stage gear 80. The head portion 68a of the rod 68, as shown in FIG. 7, is engaged by a transfer gear 83 provided within the mirror casing 56. If the engagement protrusions 68f of the head portion 68a of the fourth rod 68 engage with the slits 83a (FIG. 9) of this transfer gear 83, the fourth rod 68 cannot rotate relative to the transfer gear 83. Therefore, if the cylindrical multi-stage gear 80 rotates, the fourth rod 68 and transfer gear 83 will be rotated in interlock with the rotation of the multi-stage gear 80.

On the other hand, the mirror casing 56 is provided with a link mechanism section D for converting the rotary motion of the wiper motor 63 to reciprocating motion and a rotary shaft section E connected to the link mechanism section D, as shown in FIGS. 8 through 11.

The link mechanism section D and rotary shaft section E are equipped with a driven gear 84 meshing with the transfer gear 83, a link arm 86 mounted at one end thereof on an eccentric shaft 85 provided in the driven gear 84, and a clutch plate 87 rotatably connected to the other end of the link arm 86. Furthermore, the link mechanism section D and rotary shaft section E are equipped with a plurality of balls 88 rollable on the surface of the clutch plate 87, a triangular holding clutch 89 for holding the balls 88 by recesses 89a, a coil spring 90 elastically contacting with the holding clutch 89, a cylindrical holding portion 91 inserting the coil spring 90 thereinto and also holding the holding clutch 89 so that the holding clutch cannot rotate, and a wiper shaft 93. The wiper shaft 93 is inserted through the cylindrical holding portion 91, holding clutch 89, and clutch plate 87 and is engaged by a washer 92 so that it is not pulled out from them.

The driven gear 84 is rotatably supported on a supporting shaft 84a mounted in the mirror holder 57. The driven gear 84 is also formed with an insertion recess 84b into which one end of the eccentric shaft 85 is inserted.

The link arm 86 is interposed between the driven gear 84 and a spacer 84d opposed to the driven gear 84. The spacer 84d is rotatably supported on a supporting shaft 84c mounted in the cover 59 coaxially with the supporting shaft 84a. By inserting the other end of the eccentric shaft 85 into this spacer 84d, the rotary motion of the driven gear 84 is converted to reciprocating motion.

The clutch plate 87 is rotatable on the wiper shaft 93 and converts the reciprocating motion of the link arm 86 interlocking with the rotation of the driven gear 84 to reciprocal rotary motion. The clutch plate 87 is also formed with engagement holes 87a with which the balls 88 are always engaged by the urging force of the coil spring 90. Therefore, when an unexpected load exceeding the wiping range of the wiper main body 60 is exerted on the wiper main body 60, the balls 88 are disengaged from the engagement holes 87a. Therefore, an unexpected load is not transferred to components which leads from the clutch plate 87 to the wiper motor 63. This exhibits an effect of preventing damage to the wiper main body 60, damage to the wiper motor 63, and similar damage.

The upper portion of the cylindrical holding portion 91 is formed with an external gear 91a. In cooperation with the holding clutch 89 and clutch plate 87, the cylindrical holding portion 91 holds the wiper shaft 93 so as to allow the relative rotation of the wiper shaft 93.

The wiper main body 60 is coupled to the wiper shaft 93 through a screw 94. The wiper main body 60 is equipped with an arm head 95 covering the upper end of the cylindrical holding portion 91 and also having at its front surface a screw insertion portion 95a into which the screw 94 is inserted. Also, the wiper main body 60 is equipped with a wiper arm 96 connected to the arm head 95, an arm piece 97 connected to the point end of the wiper arm 96, and a primary lever 98 coupled to the free end portion of the arm piece 97. Furthermore, the wiper main body 60 is equipped with secondary levers 99 pivotably coupled to both ends of the primary lever 98, a wiper blade 100 pivotably held on a vertebra (not shown) held over the secondary levers 99, and an arm position adjusting screw 101 inserted into a screw insertion portion 95b formed in the side wall surface of the arm head 95. The arm position adjusting screw 101 is formed with a worm gear 101a which meshes with the gear 91a of the cylindrical holding portion 91.

Therefore, by the locked state between the gear 91a and the worm gear 110a, the reciprocal rotary motion of the clutch plate 87 interlocking with the drive of the wiper motor 63 is transferred to the wiper main body 60 through the balls 88, holding clutch 89, and cylindrical holding portion 91. This causes the wiper main body 60 to rotate reciprocally and wipe the surface of the mirror 57a (see a two-dotted line of FIG. 2).

At this time, when the wiping range is offset, a screw driver is inserted into the head portion 101b of the arm position adjusting screw 101. In this state, if the screw driver is rotated in a predetermined direction, the meshing position between the gear 91a and the worm gear 101a will be varied, and at the same time, the cylindrical holding portion 91, holding clutch 89, balls 88, and clutch plate 87 will be rotated. With this, the wiping range of the wiper main body 60 can be finely adjusted. The fine adjustment to the wiping range by the arm position adjusting screw 101 can also be performed likewise even when the wiper main body 60 is attached to the wiper shaft 93 by the screw 94, so that the attachment of the wiper main body 60 can be readily performed.

As previously described, the clutch mechanism of the above-mentioned embodiment is constituted by the clutch plate 87 rotatably supported on the other end of the link arm 86, the balls 88 rollable on the surface of the clutch plate 87, and the triangular holding clutch 89 holding the balls 88 at the recesses 89a.

Figure 12:
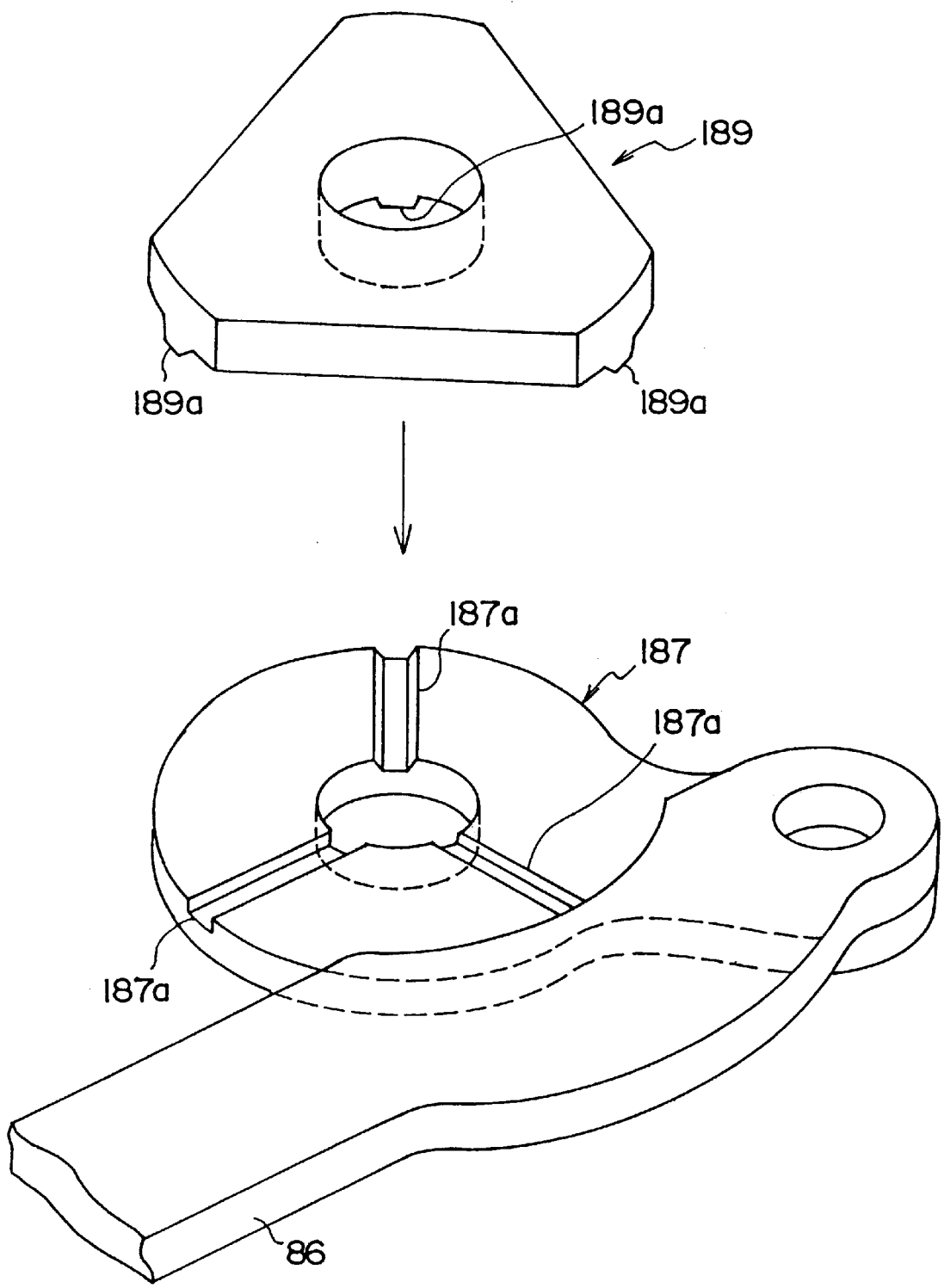
FIG. 12 is an exploded perspective view showing a variation of the clutch mechanism shown in FIG. 9.

The clutch mechanism may be formed as shown in FIG. 12. That is, a clutch plate 187 is rotatably supported on the other end of the link arm 86 and opposed to a generally triangular holding clutch 189. The triangular holding clutch 189 is formed with radial protrusions 189a which engage with slits 187a formed in the clutch plate 187. Conversely, the protrusions 189a and slits 187a may be provided in the clutch plate 187 and the triangular holding clutch 189, respectively. Also, the clutch plate 187 and triangular holding clutch 189 may have a combination of protrusions and slits. Even in these cases, the same effect as the aforementioned is obtainable.

Figure 13:
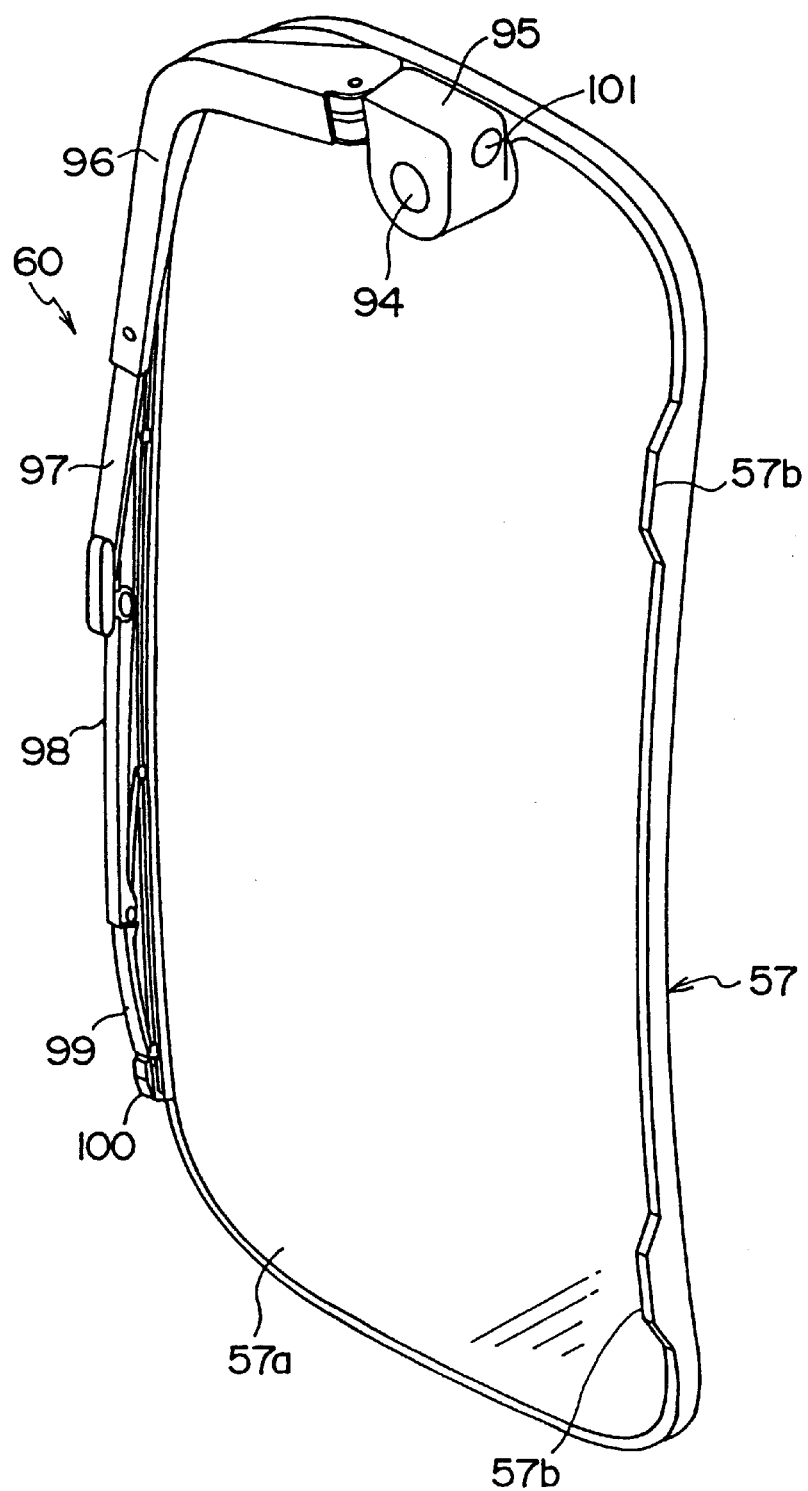
FIG. 13 is a perspective view showing the relation between the mirror and the wiper main body.
Figure 14:
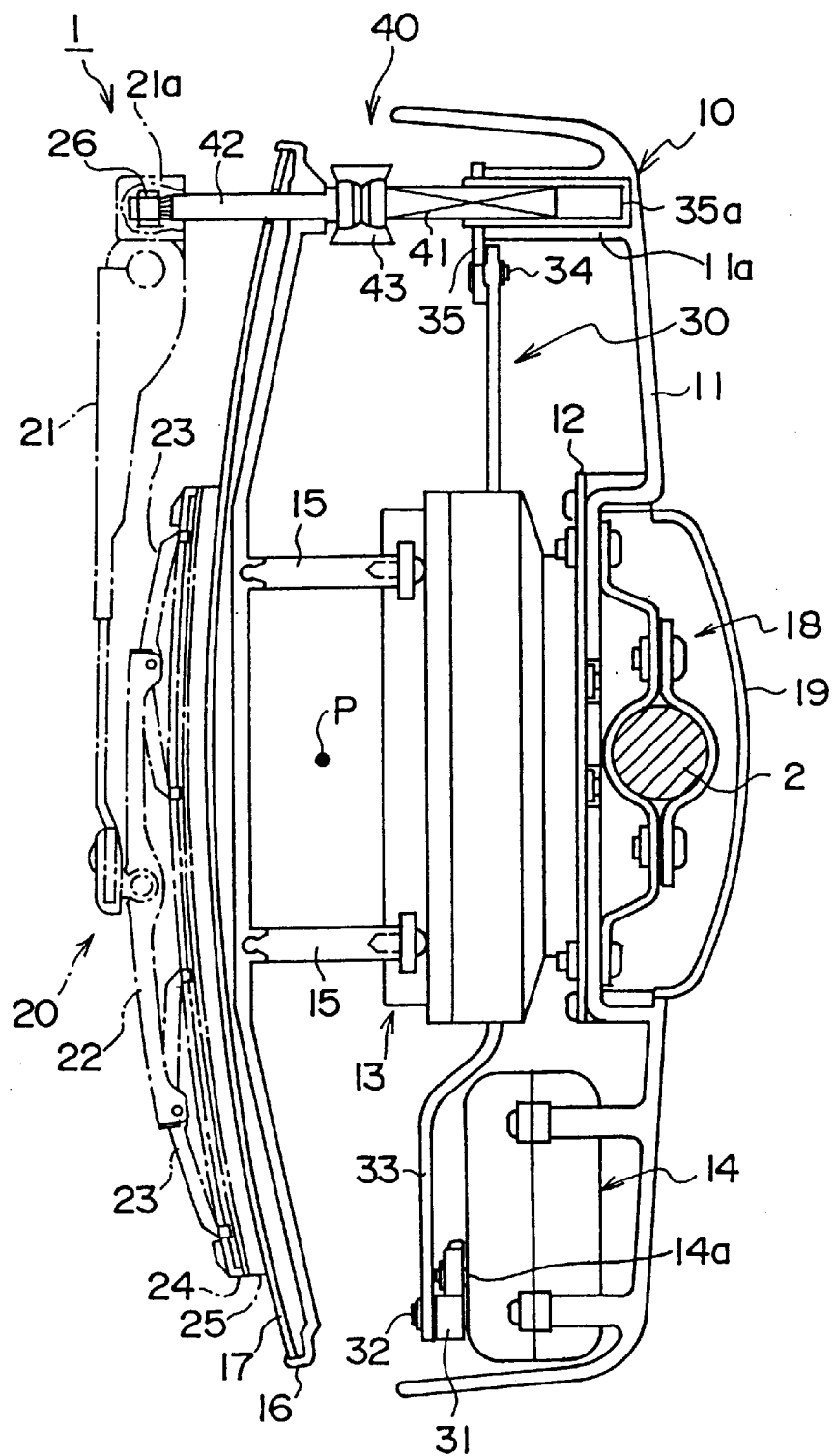
FIG. 14 is a side elevational view showing a conventional wiper for a side-view mirror, the housing of the mirror having been removed to show components within the housing.

In the above case, the mirror holder 57 may be formed with ribs 57b, as shown in FIG. 13. Also, the operating range (wiper operating angle) of the wiper main body 60 may be slightly wider than the actual wiping range of the wiper main body 60 relative to the mirror 57a. In the case where the wiper main body 60 arrives at the wiping range limit position of the mirror 57a and then abuts on the ribs 57b, if the wiper motor 63 is driven beyond that position, the clutch mechanism will be disengaged and therefore the motor system will be raced. By reverse rotation of the wiper motor 63, the clutch mechanism is engaged again, so that the wiper main body 60 can be rotated.

With this, the wiping range to the mirror 57a can be made maximum. Also, even if there is a slight error when components are assembled, the essential wiping range will not vary, so the setting of the wiper operating angle and assembly operation can be made easy.

In addition, the wide use of the drive system relative to the size or shape of the mirror 57a is enhanced, so that the cost reduction can be realized.

Furthermore, for example, even if backlash occurs in the drive system because of aged deterioration and therefore the wiper operating angle changes, the wiping range can be easily ensured by setting the wiper operating angle to an angle greater than an actual wiping range.

Thus, if the protrusion quantity of the rod 58 from the drive section casing 55 is made variable as a member for tilting the mirror 57a and is also used as a member for driving the wiper main body 60, a drive transfer member can be arranged in vicinity to the wiper shaft 93.

Therefore, the link arm 86 can be shortened. Moreover, since there is no need to provide the wiper motor on a side opposite to the wiper shaft 93 of the mirror 57a, the protrusion quantity of the rods 65 to 68 from the drive section casing 56 can be shortened, so that the thinning of the mirror body 50 is realizable.

While the present invention has been described with reference to a preferred embodiments thereof, the invention is not to be limited to the details given herein, but may be modified within the scope of the appended claims.

What is claimed is:

1. A wiper for a vehicular mirror comprising:

a mirror casing for holding a mirror;

wiper drive means housed in a drive section casing;

wiper drive transfer means, housed in said drive section casing, for transferring rotation of said wiper drive means;

a link mechanism section, housed in said mirror casing, for converting the rotation transferred by said wiper drive transfer means to reciprocating motion;

a rotary shaft section, housed in said mirror casing, for converting the reciprocating motion converted by said link mechanism section to reciprocal rotary motion;

a wiper main body for wiping a surface of said mirror by the reciprocal rotary motion converted by said rotary shaft section; and a mirror tilting unit, housed in said drive section casing, for tilting said mirror.

2. The wiper as set forth in claim 1, further comprising:

adjustment means, provided in a coupled portion between said wiper main body and said rotary shaft section, for adjusting a relative position between a range of rotation of said wiper main body and a range of rotation of said rotary shaft section; and adjustable means housed in said rotary shaft section, the adjustable means being engaged by said adjustment means.

3. The wiper as set forth in claim 1, wherein said wiper drive transfer means is equipped with a rotatable and variably protrudable rod, the rod protruding from said drive section casing and also being coupled to said mirror casing, and wherein said rod is rotated by drive of said wiper drive means and also the drive of said wiper drive means is transferred to said link mechanism section by the rotation of said rod.

4. The wiper as set forth in claim 1, further comprising clutch means for releasing a coupled state between said link mechanism section and said rotary shaft section when load applied from said wiper main body to a coupled portion between said link mechanism section and said rotary shaft section is greater than a predetermined load.

5. The wiper as set forth in claim 4, wherein said clutch means comprises a first plate provided on a side of said link mechanism section, a second plate provided on a side of said rotary shaft section, and balls provided in one of the first and second plates and engaging with the other plate.

6. The wiper as set forth in claim 4, wherein said clutch means comprises a first plate provided on a side of said link mechanism section, a second plate provided on a side of said rotary shaft section, and mutually engageable protrusions and recesses formed in said first and second plates.

* * * * *